CONTROL INFORMATION FLIP-FLOP CIRCUITS

Filed March 30, 1965 2 Sheets-Sheet 1

INVENTORS.
HOMER O. SHAPIRO,
JACK J. PARISER,
EDWARD J. DARCY,
BY Walter J. Adam
ATTORNEY.

Dec. 12, 1967 H. O. SHAPIRO ET AL 3,358,238

CONTROL INFORMATION FLIP-FLOP CIRCUITS

Filed March 30, 1965 2 Sheets-Sheet 2

INVENTORS.
HOMER O. SHAPIRO,
JACK J. PARISER,
EDWARD J. DARCY,
BY Walter J. Adam
ATTORNEY.

United States Patent Office 3,358,238

Patented Dec. 12, 1967

3,358,238

CONTROL INFORMATION FLIP-FLOP CIRCUITS

Homer O. Shapiro and Jack J. Pariser, Orange, and Edward J. Darcy, Huntington Beach, Calif., assignors to Hughes Aircraft Company, Culver City, Calif., a corporation of Delaware

Filed Mar. 30, 1965, Ser. No. 443,808

9 Claims. (Cl. 328—196)

ABSTRACT OF THE DISCLOSURE

A control information flip-flop that is responsive to control terms which govern the active and inactive states thereof. The flip-flop includes a bistable element coupled to first and second inversion gates each responsive to a control term and with the first gate also responsive to the input terms. In one arrangement the output signal of the first gate is applied to an input terminal of the second gate and in another arrangement a separate inverting gate responds to input terms to apply terms to the second gate. The flip-flop is inhibited from changing state in the absence of a control term and is reset in the presence of a control term and the absence of input terms of a predetermined state.

This invention relates to bistable multivibrator flip-flop circuits and particularly to an improved and simplified flip-flop circuit which requires a relatively small number of input signals and of gates to control the setting and resetting thereof.

Conventional JK, RS or delay flip-flops as well as J–$\bar{J}$ and K–$\bar{K}$ type flip-flops respond to logical terms which specify what information is to be written into the flip-flop and to clock terms which determine at what time the information is to be written therein. Flip-flops of these types as known in the art have been found to require an undesired amount of gating structure for complete control thereof such as to inhibit resetting of the flip-flop and to prevent information from being written therein during selected clock periods. A conventional JK or RS flip-flop has the advantage that separate logical terms are required for setting and resetting the flip-flop resulting in an undesired amount of input connections and gating structure. Delay flip-flops including J–$\bar{J}$ and K–$\bar{K}$ types, have the disadvantage that they are automatically reset in the absence of input information, in response to the next clock pulse. Conventional flip-flops of known types also have the disadvantage when utilized in registers, that a substantially large number of terms are required to be applied to each individual flip-flop. A simplified flip-flop having J–$\bar{J}$ or K–$\bar{K}$ type characteristics and operable with a minimum number of input terms, that would allow data to be selectively recorded therein, would allow data to be selectively maintained therein over a plurality of clock intervals, and would allow selective resetting of the flip-flop, would be highly advantageous to the art.

It is therefore an object of this invention to provide a flip-flop circuit that requires a minimum number of input terms.

It is another object of this invention to provide an improved and simplified flip-flop that operates with a controlled J–$\bar{J}$ or K–$\bar{K}$ type logic in which an information term of its inverse determines the state of the flip-flop in the presence of a control signal and in which the flip-flop is impervious to the information states in the absence of a control term.

It is still another object of this invention to provide an improved flip-flop utilizing control logic for selecting the operable or dormant states.

It is a further object of this invention to provide an improved synchronous flip-flop that develops controlled timing signals.

It is a still further object of this invention to provide a controlled flip-flop that with a minimum of structure provides an anti-race feature.

Briefly the controlled flip-flop arrangement in accordance with the principles of the invention includes a flip-flop circuit responsive to control terms which govern the active and inactive states. During the active state the flip-flop is set or reset corresponding to information terms or the complement thereof, respectively. The flip-flop may include first and second input gates which may be inversion gates each responsive to a control term and a clock term and with the first gate also responsive to the inverse information input terms. In one arrangement in accordance with the invention, the output signal of the first gate, which is the information terms, is also applied to an input terminal of the second gate and in another arrangement in accordance with the invention, a separate inverting gate responds to inverse information terms to apply information terms to the second gate. The bistable operation is maintained by third and fourth gates coupled to the output terminals of the respective first and second gates, respectively, with the output terminals of the third and fourth gates respectively coupled to input terminals of the fourth and third gates to develop a hold operation. Delay circuits may be coupled between the first and third gates and between the fourth and second gates to provide an anti-race characteristic. The flip-flops of the invention copy the inverse of the input information in the presence of the control term and are reset when the control term is present and set information is not applied thereto. The flip-flop is inhibited from changing state in the absence of the control term so that the stored state is retained in the flip-flop regardless of informational terms applied thereto.

The novel features of the invention, as well as the invention itself, both as to its organization and method of operation, will best be understood from the accompanying description taken in connection with the accompanying drawings, in which like reference characters refer to like parts, and in which.

Figure 1:
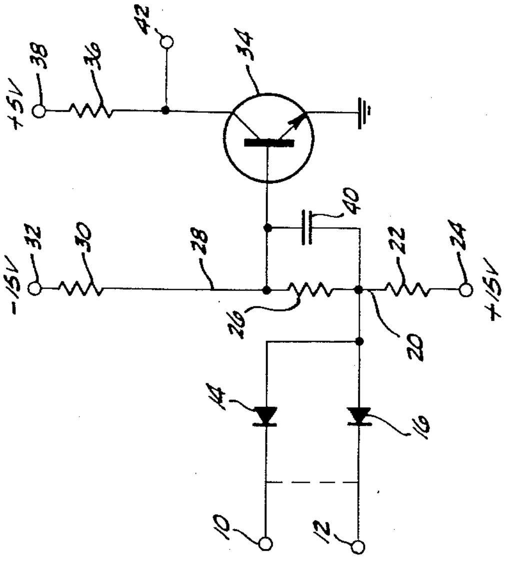
FIG. 1 is a schematic circuit diagram of a NAND (negative and) gate as a typical inversion gate that may be utilized in the flip-flop circuits in accordance with the invention.

Referring first to FIG. 1, a NAND (negative and) gate is shown as a typical inversion gate that may be utilized in the flip-flop circuits in accordance with the invention. It is to be understood that the principles of the invention are not to be limited to use of NAND gates but any inversion gate or gating combination may be utilized in accordance with the principles of the invention such as NOR (negative or) gates or conventional diode logic gates each followed by an inverter gate. A plurality of input terminals 10 and 12 are coupled through the cathode to anode paths of respective diodes 14 and 16 to a lead 20 which in turn is coupled through a resistor 22 to a +15 volt terminal 24. The lead 20 is also coupled through a resistor 26 to a lead 28 which in turn is coupled through a resistor 30 to a —15 volt terminal 32. The lead 28 is further coupled to the base of an npn type transistor 34 having an emitter coupled to ground and a collector coupled through a load resistor 36 to a +5 volt terminal 38. A capacitor 40 may be coupled between the base of the transistor 34 and the lead 20 for reducing the rise time of the transistor when being biased into conduction and for reducing the storage time when the transistor is being biased out of conduction. An output terminal 42 of the gate is coupled to the collector of the transistor 34. It is to be noted that the principles of the invention are not to be limited to the gate of FIG. 1 functioning either as an inversion "and" or an inversion "or" gate as the operation may be considered to be of either type depending upon the definition of the function or on the selection of logical levels.

In operation, with logical signals of +5 volts selected for a true level and 0 volt selected for a false level, a false signal of 0 volt applied to either or both of the input terminals 10 and 12 causes current to flow from the terminal 24 through the resistor 22 and through the corresponding diode or diodes so that the transistor 34 is maintained in a nonconductive state and a +5 volt or true signal is provided on the terminal 42. When both of the input signals applied to the terminals 10 and 12 are true or +5 volts, the diodes 14 and 16 are biased out of conduction and a positive voltage is maintained at the base of the transistor 34 so that the transistor is biased into conduction. In this state with the transistor 34 biased in conduction, approximately ground potential or a false signal level is applied to the terminal 42. The NAND gate of FIG. 1 functions either as an inversion "and" or "or" gate and when functioning as an inversion "or" gate with all of the input terminals normally held at true levels to maintain a false signal at the output terminal 42, the gate develops a true output signal in response to any or all of the input signals going to a false level. The NAND gate of FIG. 1 functions as an inversion "and" gate to develop a false output signal only when all of the input signals go to true levels. It is to be noted that the principles of the invention are not limited to any particular logical levels, but that gating circuits may be utilized having either higher or lower levels for the true level relative to the false level and with the levels being selected voltages.

Figure 2:
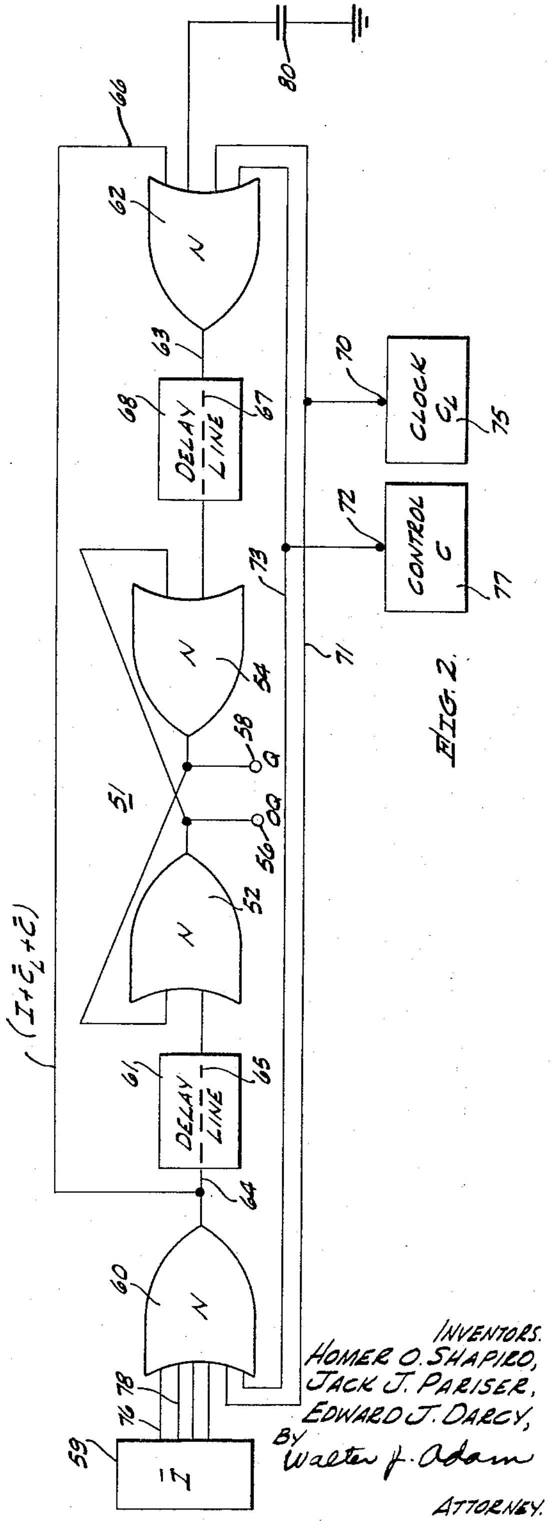
FIG. 2 is a schematic block diagram of one arrangement of the control flip-flop circuit in accordance with the principles of the invention.

Referring now to FIG. 2 which shows one arrangement of the flip-flop control system in accordance with the invention including a flip-flop circuit 51 responsive to informational and control terms, NAND gates 52 and 54 are provided to function as inversion "and" gates with the output terminal of the gate 52 coupled to a false output terminal 56 as well as to the input terminal of the gate 54 and with the output terminal of the gate 54 coupled to a true output terminal 58 as well as to an input terminal of the gate 52. It is to be noted that the flip-flops of the invention are not to be limited to structures with two output terminals but a single output terminal may be utilized. Also in the illustrated circuit, the circuit 51 is responsive to clock terms although it is to be understood that the principles of the invention are not limited to synchronous operation or to the use of clock terms. The toggle or hold operation of the gates 52 and 54 is controlled by NAND gates 60 and 62 functioning as inversion "and" gates and respectively coupled through a lead 64 and a delay line 61 and through a lead 63 and a delay line 68 to input terminals of respective NAND gates 52 and 54. The principles of the invention are not to be limited to utilizing a delay arrangement to provide an anti-race feature and the leads 64 and 63 may be directly coupled to the respective gates 52 and 54 as indicated by dotted leads 65 and 67. The informational $\bar{I}$ terms are applied to the gate 60 from a source 59. The output terminal of the gate 60 is coupled through the lead 64 and a lead 66 to an input terminal of the gate 62. The lead 66 applies a signal $(I+\bar{C}_L+\bar{C})$ which is the complement of $\bar{I}$ as well as the clock and control terms to the gate 62 in which the $\bar{C}_L$ and $\bar{C}$ are effectively cancelled in the gate 62 because inverse terms $C_L$ and C are respectively applied from a clock terminal 70 and a control terminal 72 to the "and" input terminals of gate 62. Thus the flip-flop of FIG. 2 operates as a controlled J–$\bar{J}$ or K–$\bar{K}$ type in response to single input terms such as $\bar{J}$ to internally develop the J term.

A source 75 of clock pulses or signals $C_L$ at the terminal 70 and a source 77 of control levels C at the terminal 72 are applied to the gates 60 and 62 on leads 71 and 73. The informational input signals $\bar{I}$ are applied from the source 59 through leads such as 76 and 78 to the gate 60. For accommodating delays between the informational signals applied to the lead 66 and the clock signal at the terminal 70, a capacitor 80 is coupled between ground and one input terminal of the gate 62. Unused input terminals of the gates may be coupled to a true or constant +5 volt level. It is to be noted that in the flip-flop circuits in accordance with the invention utilizing the gate of FIG. 1, a high impedance is presented to the terminal 56 or 58 from the nonconductive transistor but the voltage drop across the diodes such as 14 and 16 of the other gate 54 or 52 provides noise isolation thereat.

Figure 3:
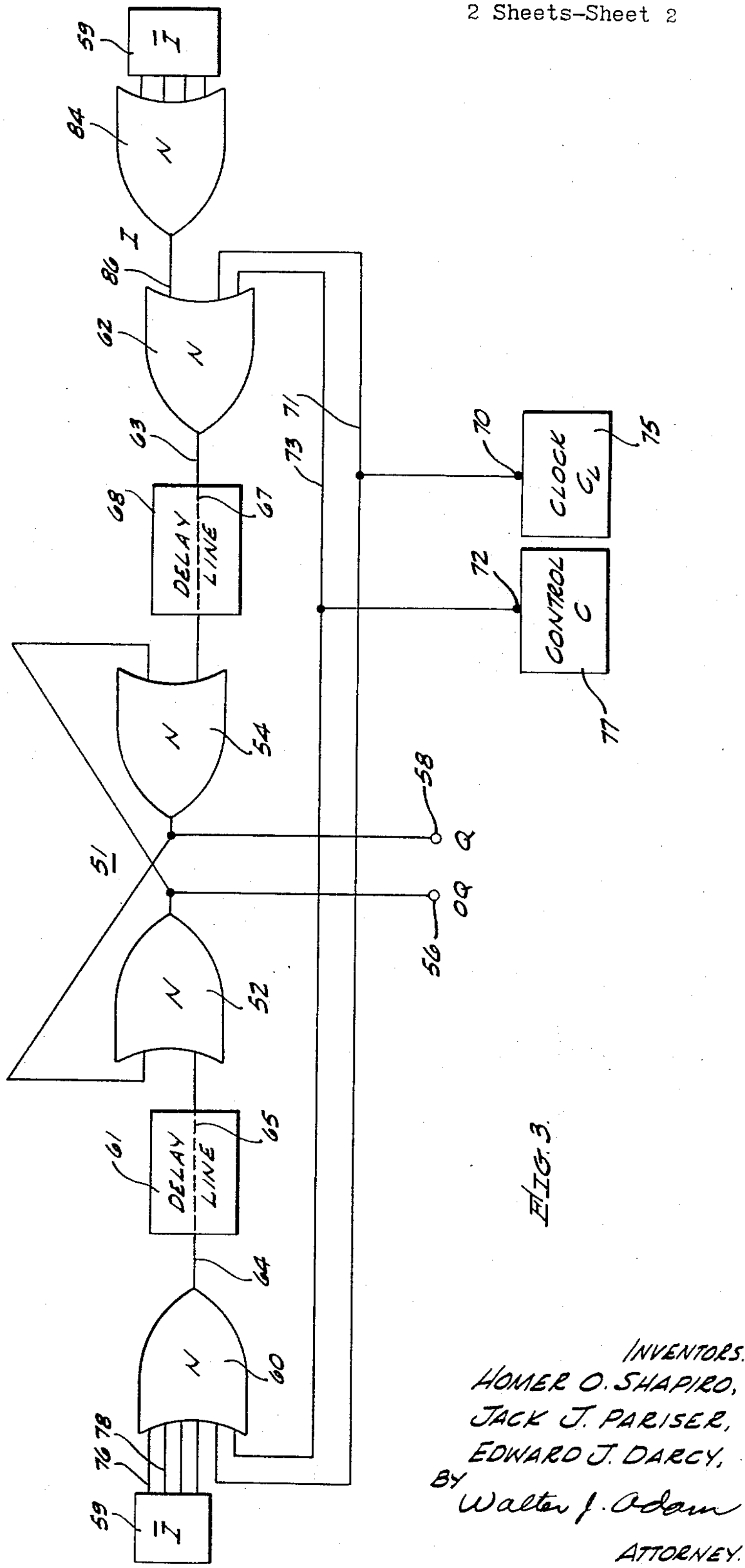
FIG. 3 is a schematic block diagram of another arrangement of the control flip-flop circuit in accordance with the invention.

Referring now to FIG. 3, another arrangement of the flip-flop in accordance with the invention is similar to FIG. 2 except a NAND gate 84 functioning as an inversion "and" gate is provided responsive to informational input terms $\bar{I}$ to apply inverted signals I to a lead 86 and to an input terminal of the gate 62. Thus the flip-flop of FIG. 3 may be considered of a controlled J–$\bar{J}$ or K–$\bar{K}$ type responsive to the $\bar{J}$ terms and developing the J terms in the gate 84, for example. The lead 66 is not provided in the arrangement of FIG. 3 as the informational terms $\bar{I}$ and the inverted terms I are applied to respective gates 60 and 62 as a result of the operation of the fifth gate 84 which functions as an inverter. The devices of the invention perform the same function with an I input rather than the illustrated $\bar{I}$ input except that the output terminals 56 and 58 respectively function as the true and false output terminals. The illustrated example is shown to conform to inverter NAND logic.

The operation of the flip-flop of FIG. 2 will now be explained in further detail. When the informational input signals $\bar{I}$ on the leads 70 and 78 are true, and a true (+5 v.) control input signal and a true (+5 v.) clock signal in the illustrated flip-flop are developed, the signal on the lead 64 goes to a false level. As is well known in the art, the clock pulses may be pulses of a relatively short duration in comparison to the interclock pulse period or may be square signals either of which may be utilized to obtain synchronous operation. The signal on the lead 64 is held at a true level by the control signal being held at a false state. When the control term is true, the signal on the lead 64 becomes false at clock time in the illustrated flip-flop to set the flip-flop to the false state or to maintain it in the false state. However, if one of the information signals is at a false level at clock time with the control term being true, the signal on the lead 64 remains at the true level and the flip-flop is set to the true state or remains in the true state. For example, if the flip-flop is in the false state with a true or +5 volt level signal at the terminal 56, the input signal applied to the gate 52 from the terminal 58 is at a false level and the signal on the lead 64 is at a true level. The gate 62 normally maintains a true signal on the lead 63 in the absence of a clock pulse. When one of the informational input signals $\bar{I}$ on the leads such as 76 and 78 is false at clock time, the signal remains true on the lead 64 and a false signal is developed by the gate 62 so that the gate 54 develops a true output signal. The gate 52 thus develops a false signal in response to the two input signals at true levels which maintains the gate 54 developing a true signal at the termination of the clock and control pulses. The signal on the lead 64 remains true after clock time because of the false states of either or both of the clock signal or the control signal. Thus the flip-flop remains in a stable "one" or set state.

The flip-flop operates in a similar manner when previously storing a true or "one" state and the informational input signals and the control input signal are all true at clock time to develop a false level on the lead 64. The gate 52 then applies a true signal to the terminal 56 which with a true signal on the lead 63 as developed by the gate 62 results in a false signal being applied to the terminal 58 from the gate 54. At the termination of the clock signal, the false signal developed by the gate 54 maintains the true signal at the terminal 56 as the signal on the lead 64 changes to a true level. Thus the flip-flop is in the "zero" or reset state. When the flip-flop is in the "one" state and one of the $\bar{I}$ signals goes to a false level at clock time with the control term true, the signal on the lead 64 remains true and the flip-flop is retained in its true state. Similarly, when the flip-flop is in the "zero" or false state and the $\bar{I}$ terms remain true at clock time with the control term at a true level, the signal on the lead 64 changes to a false level, the signal on the lead 63 remains true and the flip-flop does not change state as the gate 54 maintains a false output signal. The delay lines 61 and 68 which may be conventional distributed L–C types, provide delays of the input signals so that information may be reliably interrogated from the terminals 56 and 58 at the beginning of a clock period and new information may be written therein during the same clock period. It is to be noted that the signal at the control input terminal 72 must be true at clock time for the flip-flop to change state. Only when the control signal is at a true level at clock time will the flip-flop copy the input information applied to the gate 60. If the signal at the control input terminal 72 is false at clock time, the flip-flop remains in its previous state as the signal on the lead 64 remains true or unchanged and the signal developed by the gate 62 on the lead 63 remains at the true level. Also if the signal at the control input terminal 72 is maintained at a true level, the flip-flop is reset to the true state at clock time when the $\bar{I}$ terms are all at true levels to function with a delay flip-flop characteristic of being reset at the next clock pulse in the absence of an input signal. Thus, the flip-flop is automatically reset when the control signal is true and in the absence of informational input signals and when the control signal is false, the flip-flop is inhibited from changing state regardless of input information applied to the gate 60.

The flip-flop circuit of FIG. 3 operates in a manner similar to that of FIG. 2 except that the informational input signals $\bar{I}$ are applied from the source 59 to both the gates 60 and 84 and the complemented input signal or I is applied from the gate 84 to the gate 62. In the arrangement of FIG. 3, the I or J term is developed by the gate 84 rather than by an internal connection. It is to be noted that the arrangement of FIG. 3 is especially useful when the circuits are formed of microelectronic structure, for example. The gates 60 and 62 maintain a true signal on the lead 64 which only changes at clock time in the illustrated synchronous flip-flop in response to a control term and with all of the informational input signals $\bar{I}$ at the true levels. The gate 84 maintains a false level on the lead 86 which only changes to a true level when one of the informational input signals $\bar{I}$ at its input terminal goes to a false level. The gate 62 only develops a false signal on the lead 63 when one of the $\bar{I}$ terms is at a false level and the clock and control signals are at true levels to set the flip-flop to the "one" state. The signals on the leads 64 and 63 are maintained at true levels in the absence of either a control or a clock signal. At clock time in the presence of a control signal C at the true level and at least one informational signal $\bar{I}$ at a false level, the signal on the lead 64 remains at the true level, the signal on the lead 86 is at the true level and the signal on the lead 63 goes to the false level so that a true output level is developed or maintained by the gate 54. If all of the $\bar{I}$ terms remain at the true level at clock time with the control signal at a true level, the signal on the lead 64 goes false to apply or maintain a true signal at the terminal 56 which is the "zero" state of the flip-flop. The recorded states of the gates 52 and 54 are maintained at the termination of the clock pulse as explained relative to FIG. 2.

In the absence of a control input term at clock time, the signals on the leads 64 and 63 remain at true levels and the flip-flop is inhibited from changing state. In the absence of any informational input signals $\bar{I}$ at a false level at clock time with the control term at the true level, the flip-flop is reset to the "zero" state.

The flip-flops of FIGS 2 and 3 may utilize any desired logical terms for the informational input signals I or $\bar{I}$. The control signal may be derived from a common term which may be the "or" function of a plurality of control terms such as may be required to activate a register, for example. The principles of the invention are not to be limited to flip-flops responding to clock signals as the operation may be controlled only by a control term. It is to be again noted that the principles of the invention are applicable to flip-flop structures either with or without the delay lines 66 and 68.

Thus there has been described a simplified control information type flip-flop that responds to control terms and informational terms to minimize gating structure, especially when utilized in registers. The flip-flop circuit of the system utilizes inversion type gates to provide a maximum amount of control with a minimum of structure. For a synchronous flip-flop in accordance with the invention, the control term effectively gates the clock pulse so that the contents are inhibited from being changed in the absence of a control term and the flip-flop is automatically reset at the next clock pulse in the presence of a control term and in the absence of an informational input set signal. The flip-flop of the invention may either utilize a single informational input gate or two informational input gates, the latter of which may be desirable for systems utilizing microelectronic circuit structures.

What is claimed is:

1. A flip-flop responsive to information signals, clock signals and control signals comprising a first gate responsive to the combination of an absence of information signals, a clock signal and a control signal and responsive to an information signal to develop an inverted signal, a second gate responsive to the combination of said clock signals said control signals and said inverted signal, means coupling said first gate to said second gate to apply said inverted signal thereto, a third gate coupled to said first gate, a fourth gate coupled to said second gate, and means intercoupling said third and fourth gates for maintaining a set or a reset state, whereby said flip-flop is set only on coincidence of information signals at said first gate and clock and control signals at said second gate, is reset on coincidence of clock and control signals and the absence of information signals at said first gate and is inhibited from being set or reset in the absence of clock or control signals at said first and second gates.

2. A flip-flop circuit comprising a first inverting gate having a plurality of input terminals and an output terminal, a second inverting gate having a plurality of input terminals and an output terminal, bistable means having reset and set states and having first and second input terminals respectively coupled to the output terminals of said first and second inverting gates, means coupling the output terminal of said first inverting gate to an input terminal of said second inverting gate, a source of information signals coupled to selected input terminals of said first inverting gate, a source of clock signals coupled to an input terminal of each of said first and second inverting gates, and a source of control signals coupled to an input terminal of each of said first and second inverting gates, said first inverting gate developing a signal to reset said bistable means on combination of a clock and a control signal and the absence of information signals, said second inverting gate developing a signal to set said bistable means on combination of an information signal, a clock signal and a control signal, and said first and second inverting gates being inhibited from developing set or reset signals in the absence of clock or control signals.

3. A flip-flop circuit comprising a source of information signals, a source of control signals, a source of clock signals, first, second, third and fourth inverting gates each having input terminals and an output terminal, means coupling the source of information signals to selected input terminals of said first inverting gate, means coupling the source of control signals and the source of clock signals to selected input terminals of said first and second inverting gates, means coupling the output terminal of said first inverting gate to a selected input terminal of said second inverting gate, means coupling the output terminal of said first inverting gate to an input terminal of said third inverting gate, means coupling the output terminal of said second inverting gate to an input terminal of said fourth inverting gate, means coupling the output terminals of said third inverting gate to an input terminal of said fourth inverting gate, and means coupling the output terminal of said fourth inverting gate to an input terminal of said third inverting gate.

4. A flip-flop responsive to information signals and control signals comprising a first inverting gate responsive to a combination of a control signal and the absence of the information signals to develop a first signal, a second inverting gate responsive to an information signal to develop a second signal, a third inverting gate responsive to a combination of said second signal and a control signal to develop a third signal, a fourth inverting gate responsive to said first signal for developing a fourth signal, a fifth inverting gate responsive to said third signal for developing a fifth signal, and means intercoupling said fourth and fifth gates for maintaining said fourth or said fifth signals in the absence of said first and third signals.

5. A flip-flop circuit comprising a source of information signals, a source of control signals, a source of clock signals, first, second, third, fourth and fifth inverting gates each having input terminals and an output terminal, means coupling the source of information signals to selected input terminals of said first and fifth gates, means coupling the output terminal of said fifth gate to a selected input terminal of said second gate, means coupling the output terminal of said first gate to an input terminal of said third gate, means coupling the output terminal of said second gate to an input terminal of said fourth gate, means intercoupling an output terminal of one and an input terminal of the other of both said third and fourth gates to provide a bistable element having set and reset states, and means coupling the source of control signals and the source of clock signals to selected input terminals of said first and second gates for setting the bistable element on coincidence of information, clock and control signals, for resetting the bistable element on coincidence of clock and control signals in the absence of information signals and for inhibiting setting or resetting of said bistable element on non-coincidence of clock and control signals.

6. A flip-flop circuit comprising a source of information signals, a source of control signals, first, second, third, fourth and fifth inverting gates each having input terminals and an output terminal, means coupling the source of information signals to selected input terminals of said first and fifth gates, means coupling the output terminal of said fifth gate to a selected input terminal of said second gate, means coupling the output terminal of said first gate to an input terminal of said third gate, means coupling the output terminal of said second gate to an input terminal of said fourth gate, means intercoupling an output terminal of one and an input terminal of the other of both said third and fourth gates to provide a bistable element having set and reset states, and means coupling the source of control signals to selected input terminals of said first and second gates for setting the bistable element on coincidence of information and control signals, for resetting the bistable element in the presence of control signals and in the absence of information signals and for inhibiting setting or resetting of said bistable element in the absence of control signals.

7. A flip-flop circuit comprising a source of clock signals, a source of control signals, a source of selected information signals, a bistable element having reset and set input terminals respectively responsive to reset and set signals to develop reset and set states, a first inverting gate coupled from said source of information signals, said source of clock signals and said source of control signals to said reset terminal for developing a reset signal only in response to the combination of a control signal, a clock signal and the absence of said information signals, a second inverting gate coupled to said source of information signals for developing an inverted information signal in response to an information signal, and a third inverting gate coupled from said second inverting gate, said source of control signals and said source of clock signals to said set terminal for developing a set signal only in response to the combination of a control signal, a clock signal and said inverted information signal, whereby said first, second and third inverting gates control said bistable element to be inhibited from changing state in the absence of a coincidence of a clock signal and a control signal and to be changed to or maintained in the reset state in the presence of a clock signal and a control signal in the absence of any of said information signals.

8. A flip-flop circuit comprising a source of control signals, a source of selected information signals, a bistable element having reset and set input terminals respectively responsive to reset and set signals to develop reset and set states, a first inverting gate coupled from said source of information signals and said source of control signals to said reset terminal for developing a reset signal only in response to the combination of a control signal and the absence of said information signals, a second inverting gate coupled to said source of information signals for developing an inverted information signals in response to an information signal, and a third inverting gate coupled from said second inverting gate and said source of control signals to said set terminal for developing a set signal only in response to the combination of a control signal and said inverted information signal, whereby said first, second and third inverting gates control said bistable element to be inhibited from changing state in the absence of a control signal and to be changed or maintained in the reset state in response to a control signal in the absence of any of said information signals.

9. A binary storage system comprising a source of information signals, a source of clock signals, a source of control signals, a first gate having an input circuit coupled to said source of information signals, to said source of control signals and to said source of clock signals, and having an output circuit, a second gate having an input circuit coupled to said source of control signals, to said source of clock signals and to the output circuit of said first gate and having an output circuit, and bistable means having a first input circuit coupled to the output circuit of said first gate and a second input circuit coupled to the output circuit of said second gate, for being set in response to a combination of information, clock and control signals provided by said first gate, for being reset in response to a combination of clock and control signals in the absence of information signals provided by said second gate and for being inhibited from being set or reset in the absence of a clock or control signal.

References Cited

UNITED STATES PATENTS

| | | | |
|---|---|---|---|
| 2,883,525 | 4/1959 | Curtis | 307—88.5 |
| 3,049,628 | 8/1962 | Kaufman | 307—88.5 |
| 3,145,343 | 8/1964 | Horton | 328—93 |
| 3,153,200 | 10/1964 | Wahrman et al. | 307—88.5 |
| 3,243,652 | 3/1966 | Meyer et al. | 307—88.5 |

ARTHUR GAUSS, *Primary Examiner.*

B. P. DAVIS, *Assistant Examiner.*